United States Patent
Dolan

(10) Patent No.: US 6,644,336 B2
(45) Date of Patent: Nov. 11, 2003

(54) METHOD AND APPARATUS FOR AUTOMATIC SHUTOFF OF A VALVE WHEN A SUBSTANCE IS PRESENT IN A FLOW OF FLUID

(75) Inventor: Lyman J. Dolan, Kemah, TX (US)

(73) Assignee: Oil States Industries, Inc., Arlington, TX (US)

(*) Notice: Subject to any disclaimer, the term of this patent is extended or adjusted under 35 U.S.C. 154(b) by 167 days.

(21) Appl. No.: 09/879,379

(22) Filed: Jun. 12, 2001

(65) Prior Publication Data

US 2002/0185174 A1 Dec. 12, 2002

(51) Int. Cl.[7] ............................ F16K 17/00; F16K 17/04
(52) U.S. Cl. .................................. 137/68.11; 137/68.16; 137/75
(58) Field of Search ........................ 137/67, 68.11, 137/74, 75, 68.16

(56) References Cited

U.S. PATENT DOCUMENTS

| | | | | |
|---|---|---|---|---|
| 2,347,202 A | * | 4/1944 | Lindsay ......................... | 137/67 |
| 2,347,203 A | * | 4/1944 | Lindsay ......................... | 137/67 |
| 2,347,204 A | * | 4/1944 | Lindsay ......................... | 137/67 |
| 2,630,346 A | * | 3/1953 | Carlson ......................... | 137/67 |
| 2,678,055 A | * | 5/1954 | Heim ............................ | 137/67 |
| 2,778,376 A | | 1/1957 | Chester ........................ | 137/268 |
| 3,472,253 A | | 10/1969 | Herscher et al. ............... | 137/67 |
| 3,491,911 A | | 1/1970 | Fraylick et al. ............... | 220/26 |
| 3,520,314 A | | 7/1970 | Ryen ............................ | 137/67 |
| 3,586,018 A | | 6/1971 | Bogardh et al. ............... | 137/67 |
| 5,036,875 A | | 8/1991 | Thiltgen ....................... | 137/74 |
| 5,960,811 A | | 10/1999 | Partridge ...................... | 137/68.11 |

FOREIGN PATENT DOCUMENTS

GB 652072 4/1951

OTHER PUBLICATIONS

"Check Mate® Hydrocarbon Sensing Valve Installation, Operation & Maintenance Instructions," HMT Inc., 4422 FM 1960 West, Suite 350, Houston, Texas 77068 (12 pages).

* cited by examiner

Primary Examiner—George L. Walton
(74) Attorney, Agent, or Firm—Howrey Simon Arnold & White

(57) ABSTRACT

A tensile load is applied to a sensor element that will carry the tensile load in the absence of a substance and will fail to carry the tensile load in the presence of the substance. The sensor element is disposed in a flow of fluid, and a flow control member is actuated to shut off the flow of fluid when the sensor element fails to carry the tensile load. In a preferred implementation, a hydrocarbon sensing valve includes a polystyrene sensor element suspending the flow control member above a valve seat. The sensor element is disposed in a cavity in the top of the flow control member, and a channel member directs fluid from the inlet port to the cavity. The sensor element is pinned to the channel member, and the flow control member is pinned to the sensor element.

33 Claims, 7 Drawing Sheets

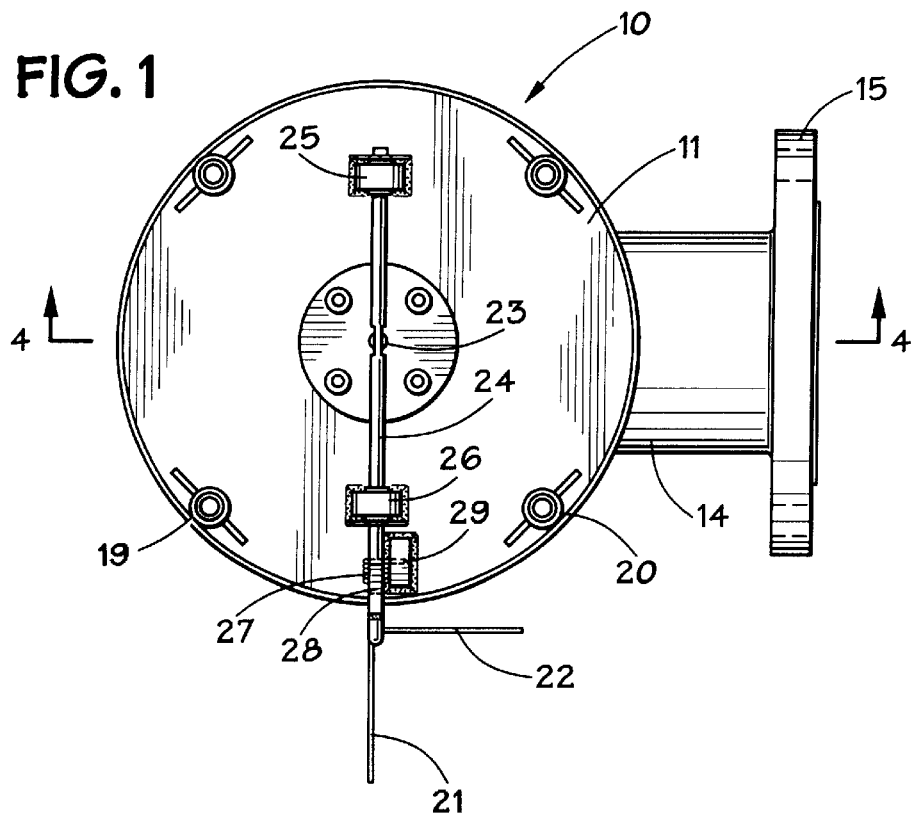

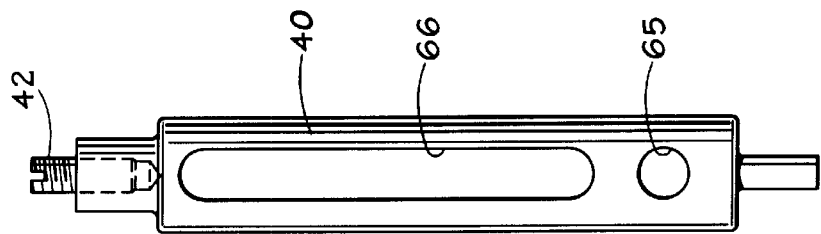
FIG. 11
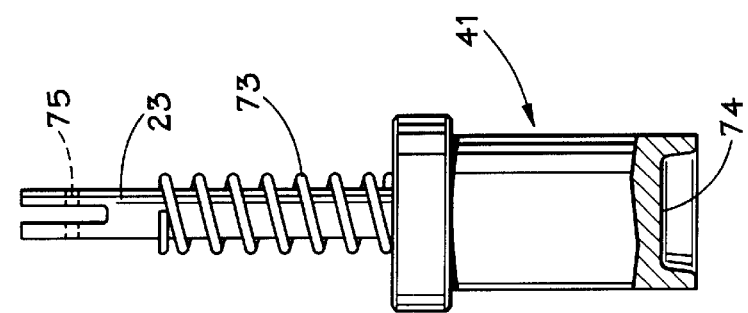
FIG. 10
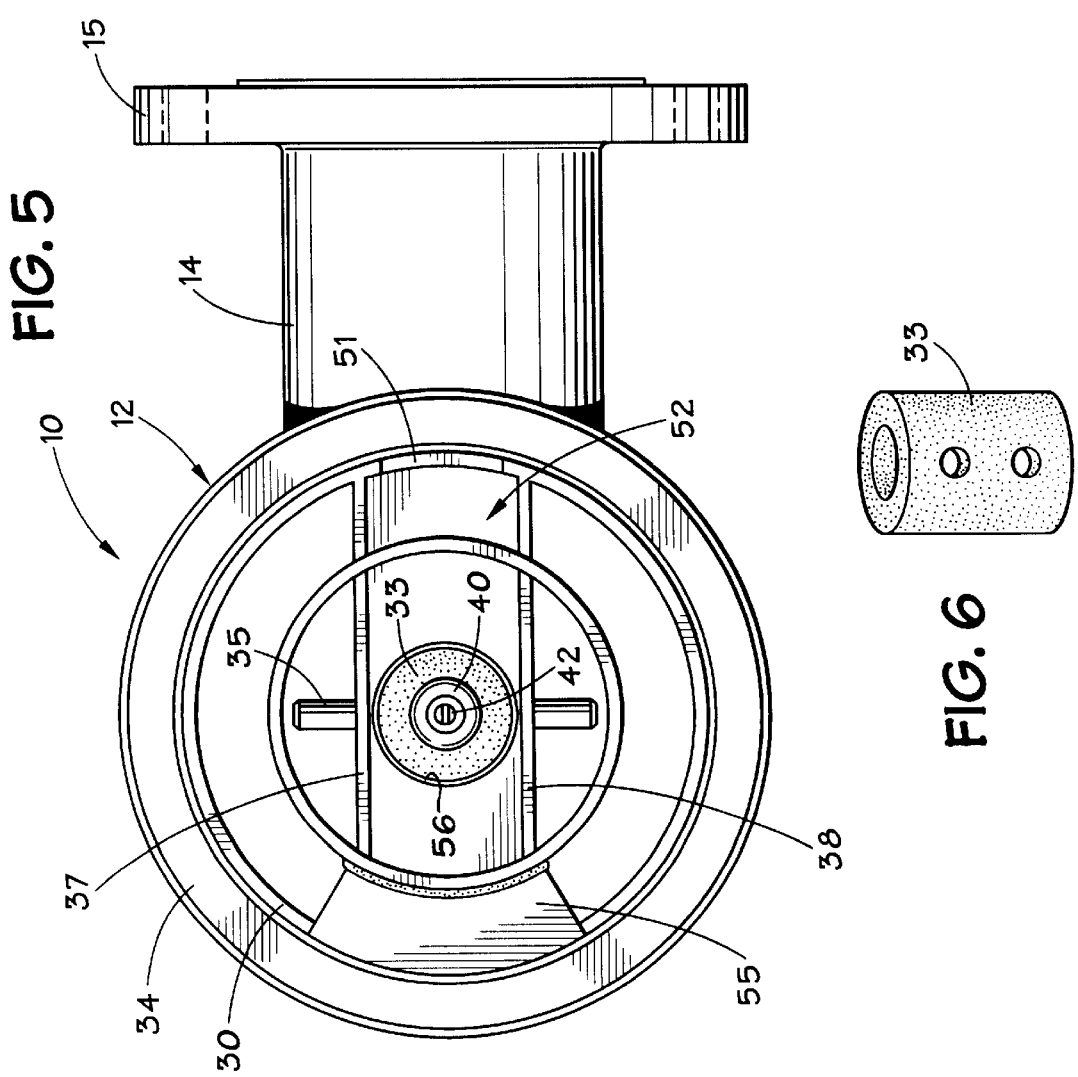
FIG. 5
FIG. 6

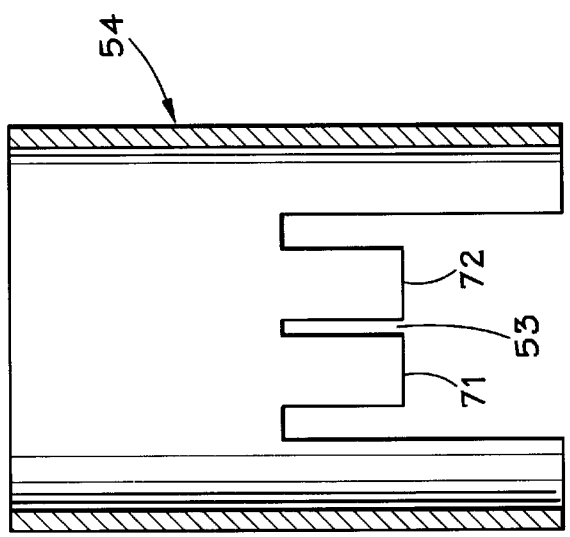
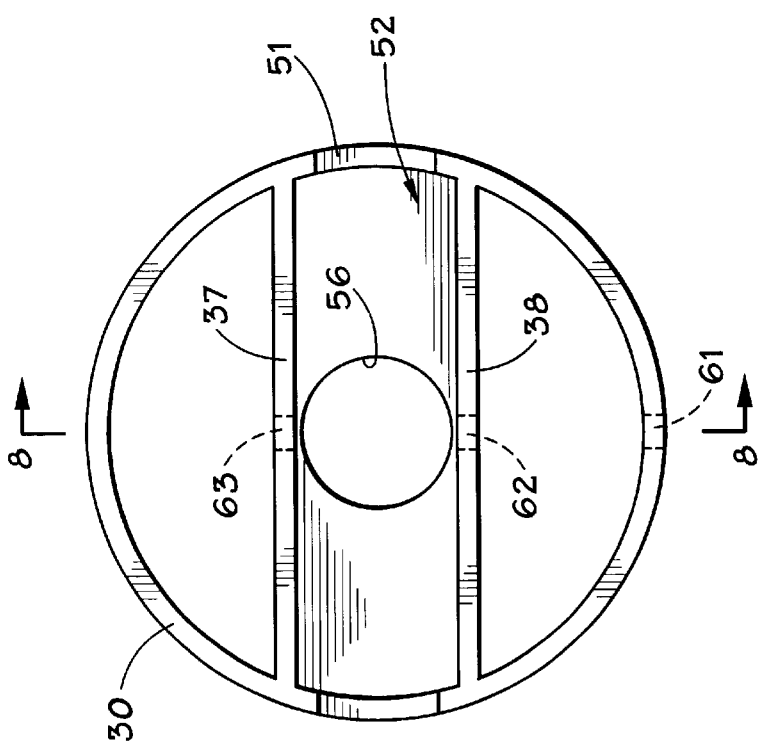
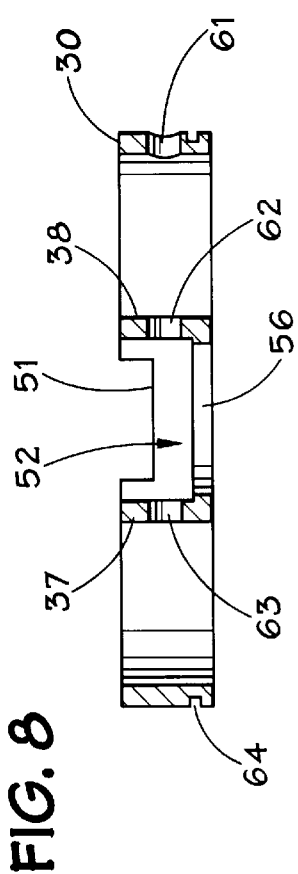

METHOD AND APPARATUS FOR AUTOMATIC SHUTOFF OF A VALVE WHEN A SUBSTANCE IS PRESENT IN A FLOW OF FLUID

BACKGROUND OF THE INVENTION

1. Field of the Invention

The present invention relates to a valve that responds to the presence of a particular substance in fluid flowing through the valve, such as the presence of hydrocarbon in a flow of water.

2. Description of the Related Art

In the petroleum industry, it is often possible for hydrocarbon to leak into a flow of water that is discharged into the environment. For example, a hydrocarbon storage tank (such as is found in a "tank farm") often has an internal drain pipe to allow drainage of water from a fixed or floating roof of the tank. It is possible for an internal drain pipe to leak, causing stored hydrocarbon to drain from the tank. To prevent the contents of the tank from being drained to the atmosphere or ground, the discharge end of the drain pipe should be fitted with a hydrocarbon sensing automatic shutoff drain valve.

Hydrocarbon sensing automatic shutoff drain valves are described in Fraylick et al. U.S. Pat. No. 3,491,911 issued Jan. 27, 1970; Thiltgen U.S. Pat. No. 5,036,875 issued Aug. 6, 1991; and Partridge U.S. Pat. No. 5,960,811 issued Oct. 5, 1999. These automatic shutoff drain valves employ a hydrocarbon soluble triggering element disposed in the discharge flow, and a spring that closes the valve upon dissolution of the triggering element. The valves are intended to close in response to a relatively small trickle of water containing hydrocarbon. However, the flow through the open valve should not be unduly restricted or else clogging may occur from debris which is often present in drainage from tank roofs. Yet it is most desirable that the valve will close in a reliable fashion as soon as possible after hydrocarbon begins to flow through the valve.

Conventional hydrocarbon sensing valves use a polystyrene sensor element that dissolves quickly in gasoline but dissolves rather slowly in medium to heavy hydrocarbon such as diesel fuel, fuel oil, or crude oil. Consequently, the conventional hydrocarbon sensing valves have rather poor closure time in the presence of medium to heavy hydrocarbon. It is desired to achieve a closure time in the presence of medium to heavy hydrocarbon that is comparable to the closure time of conventional hydrocarbon sensing valves in the presence of gasoline. Therefore, the present invention is directed to reducing the time for a sensing valve to close when the sensor element is slowly dissolving or disintegrating due to the presence of a fluid flowing through the valve.

SUMMARY OF THE INVENTION

In accordance with one aspect of the invention, there is provided a method of shutting off a flow of fluid when a substance is present in the fluid. A tensile load is applied to a sensor element that will carry the tensile load in the absence of the substance and will fail to carry the tensile load in the presence of the substance. The sensor element is disposed in the flow of fluid, and a flow control member is actuated to shut off the flow of fluid when the sensor element fails to carry the tensile load.

In accordance with another aspect of the invention, there is provided a sensing valve for shutting off a flow of fluid when a substance is present in the fluid. The sensing valve includes a housing having an inlet port and an outlet port; a flow control member, and a sensor element. The flow control member is disposed in the housing for permitting the flow of fluid from the inlet port to the outlet port when the flow control member is in an open position, and shutting off the flow of fluid from the inlet port to the outlet port when the flow control member is in a closed position. The sensor element is responsive to the presence of the substance in the fluid, and the sensor element is coupled to the flow control member and the housing for causing the flow control member to move from the open position to the closed position when the substance is present in the fluid. In addition, the sensor element is coupled to the flow control member and the housing for applying a tensile load to the sensor element and causing the flow control member to move from the open position to the closed position when the sensor element fails to carry the tensile load in response to the presence of the substance in the fluid.

In accordance with yet another aspect, the invention provides a sensing valve for shutting off a flow of fluid when a substance is present in the fluid. The sensing valve includes a housing, a flow control member, a sensor element, and a channel member. The housing has a generally horizontal pipe section providing an inlet port, and the housing has a generally vertical cylindrical section providing an outlet port at a lower region of the generally vertical cylindrical section. The flow control member is disposed in the generally vertical cylindrical section of the housing for permitting the flow of fluid from the inlet port to the outlet port when the flow control member is in an open position, and shutting off the flow of fluid from the inlet port to the outlet port when the flow control member is in a closed position. The sensor element is responsive to the presence of the substance in the fluid and coupled between the flow control member and the housing for causing the flow control member to move from the open position to the closed position when the substance is present in the fluid. The sensor element is coupled between the flow control member and the housing for applying a tensile load to the sensor element and causing the flow control member to move from the open position to the closed position when the sensor element fails to carry the tensile load in response to the presence of the substance in the fluid. In addition, the sensor element is seated in a cavity in the top of the flow control member, and the sensing valve has a channel member for directing the flow of fluid from the inlet port to the cavity in the top of the flow control member. The sensor element is pinned to the channel member by a first pin, and the sensor element is pinned to the flow control member by a second pin.

In accordance with still another aspect, the invention provides a sensing valve for shutting off a flow of fluid when a substance is present in the fluid. The sensing valve includes a housing, a flow control member, a sensor element, and a channel member. The housing has a generally horizontal pipe section providing an inlet port, and the housing has a generally vertical cylindrical section providing an outlet port at a lower region of the generally vertical cylindrical section. The flow control member is disposed in the housing for permitting the flow of fluid from the inlet port to the outlet port when the flow control member is in an open position, and shutting off the flow of fluid from the inlet port to the outlet port when the flow control member is in a closed position. The sensor element is responsive to the presence of the substance in the fluid and coupled to the flow control member and the housing for causing the flow control member to move from the open position to the closed position when the substance is present in the fluid. The channel member is seated in the cylindrical section of the housing for directing the flow of fluid from the inlet port to the sensor element. In addition, the housing includes a removable cover, the flow control member and the sensor element are mounted to the channel member, and an assembly of the channel member, the flow control member, and the sensor element is removable from the housing when the cover is removed to open the housing.

BRIEF DESCRIPTION OF THE DRAWINGS

Other objects and advantages of the invention will become apparent upon reading the following detailed description with reference to the accompanying drawings wherein:

FIG. 1 is a top view of a sensing valve in accordance with the present invention;

FIG. 2 is a side view of the sensing valve of FIG. 1;

FIG. 5 is a top view of the sensing valve as seen when the valve cover is removed;

FIG. 6 is a perspective view of the sensor element in the sensing valve of FIG. 1;

FIG. 7 is a top view of a channel member used in the sensing valve;

FIG. 8 is a cross-sectional view of the channel member of FIG. 7 as originally seen in FIG. 3;

FIG. 9 is a cross-sectional view of a shroud used in the sensing valve;

FIG. 10 is a front view of a plunger and spring assembly used in the sensing valve;

FIG. 11 is a front view of a stopper shaft used in the sensing valve;

Figure 3:
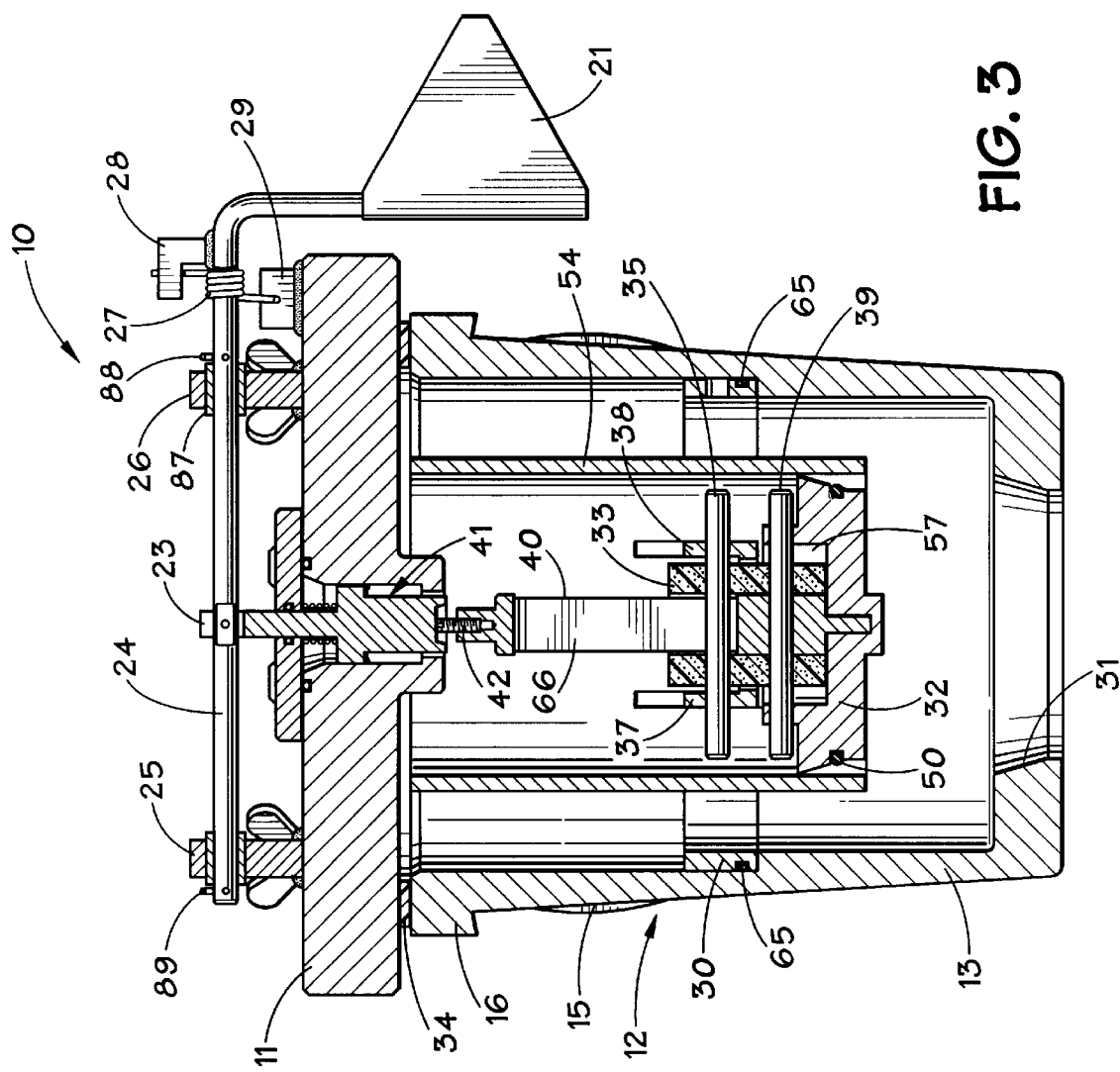
FIG. 3 is a cross-section view of the sensing valve along section line 3—3 in FIG. 2.

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the scope of the invention as defined by the appended claims.

DESCRIPTION OF ILLUSTRATIVE EMBODIMENTS

With reference to FIGS. 1 and 2, there is shown a preferred embodiment of a hydrocarbon sensing automatic shutoff drain valve 10 in accordance with the present invention. The valve 10 has a valve cover 11 and a valve body 12 including a cylindrical section 13 and an inlet pipe 14 extending generally normal to the cylindrical section 13. The inlet pipe 14 is terminated with a conventional flange 15 for bolting the valve 10 to a discharge end of a drain pipe (not shown) or to a discharge port of a hydrocarbon storage tank roof drain block valve (not shown). As seen in FIG. 2, the cylindrical section 13 has an upper flange 16 engaged by dogs 17, 18 (FIG. 2) for clamping the valve cover 11 to the valve body 12 when wing nuts 19, 20 are tightened.

For indicating whether the valve 10 is open or closed, the valve has a pair of flags 21, 22 that are normally in a "down" position as shown in FIGS. 1 and 2 when the valve is open, and are in a raised position when the valve is closed. In order to raise the flags 21, 22 when the valve closes, a plunger shaft 23 coaxial with the cylindrical section 13 protrudes from the valve cover 11. When the plunger shaft 23 is in a raised position, it interferes with rotation of a shaft 24 upon which the flags 21, 22 are mounted. The shaft 24 is mounted to a pair of support lugs 25, 26 secured to the top of the valve cover 11.

As best seen in FIG. 3, a torsion spring 27 wound around the shaft 24 is tensioned to rotate the shaft 24 by 180 degrees when the plunger shaft 23 is lowered toward the valve body. One end of the torsion spring 27 abuts against a stop 28 welded to the shaft 24, and another end of the torsion spring 27 is received in a hole in stop 29 welded to the top of the valve cover 11.

With reference to FIG. 3, the bottom of the cylindrical section 13 of the valve body 12 has a tapered cylindrical outlet port 31 that can be closed by a tapered cylindrical stopper 32. A polystyrene sensor element 33 normally holds the stopper 32 above the outlet port 31. However, when the sensor element 33 is degraded by the presence of hydrocarbon, the stopper 32 drops into and closes the outlet port 31. In other words, the stopper 32 functions as a flow control member having an open position as shown in FIG. 3 for permitting a flow of fluid from the inlet port to the outlet port, and also having a closed position for shutting off the flow of fluid. The stopper 32 has an annular peripheral groove containing a nitrile O-ring 50 to provide a fluid-tight seal to close the valve 10 when the stopper drops into the outlet port 31. A nitrile gasket 34 provides a fluid-tight seal between the valve cover 11 and the valve body 12. The gasket 34 is bonded to the valve body 12 with rubber adhesive so that the gasket will not become misplaced when the valve cover is removed for servicing.

In order to obtain more rapid valve closure than is obtainable from a conventional sensing valve in the presence of medium or heavy hydrocarbons such as diesel fuel, fuel oil, or crude oil, the sensing valve 10 is configured to impart a tensile load rather than a compressive load upon the polystyrene sensor element 33. The sensor element 33 has a higher yield strength in tension than compression, and exposure to aromatic hydrocarbon results in a sudden and complete loss of tensile strength and consequently a rapid valve closure.

As shown in FIG. 3, an upper pin 35 secures the upper portion of the sensor element 33 to side rails 37,38 of a channel spinning a ring 30 fitted into the cylindrical section 13 of the valve body 12. A lower pin 39 secures the lower portion of the sensor element 33 to the stopper 32. Therefore, the mid-section of the sensor element 33 between the pins 35, 39 is placed in tension by the weight of the stopper 32.

The lower pin 39 also attaches a stopper shaft 40 to the stopper 32. The stopper shaft 40 has an elongated slot 66 to receive the pin 35 and to permit downward movement of the stopper shaft 40 as the stopper 32 falls toward the outlet port 31. Therefore, when the stopper falls toward the outlet port 31, the stopper shaft 40 guides the stopper 32 into alignment with the outlet port 31. The stopper shaft 40 also supports a spring-loaded plunger 41 providing the plunger shaft 23 protruding above the valve cover 11. Spring force and the weight of the spring-loaded plunger 41, and also the weight of the stopper shaft 40, are applied to the sensor element 33. The bottom of the spring-loaded plunger 41 rests on a set screw 42. During assembly of the valve, the set screw 42 is adjusted so that the top of the set screw is aligned with the bottom of the valve cover 11, ensuring that the top of the plunger shaft 23 will become aligned with the shaft 24 for raising the flags 21, 22.

Figure 4:
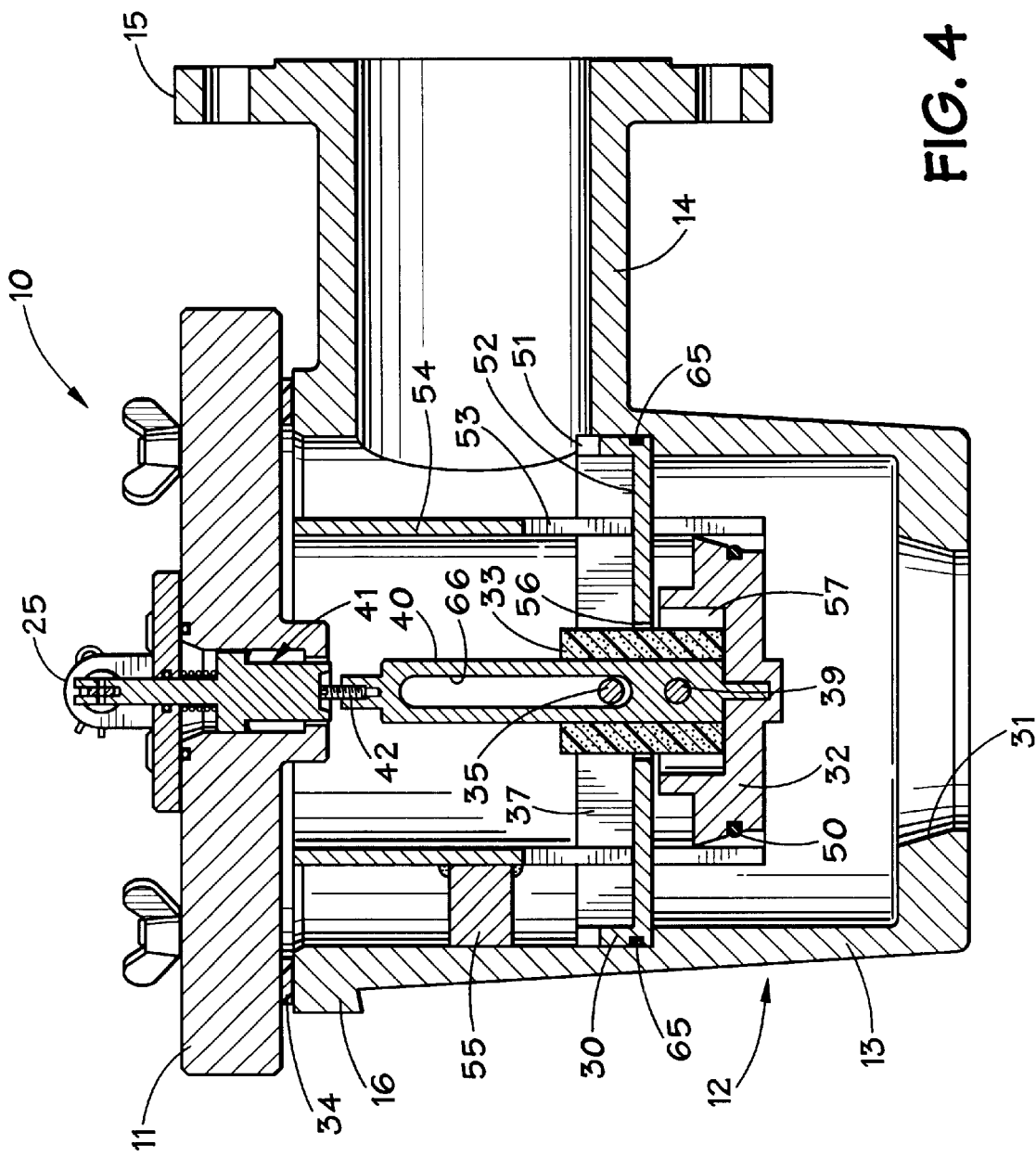
FIG. 4 is a cross-section view of the sensing valve along section line 4—4 in FIG. 1.

FIG. 4 shows further details of the inlet flow channel in the valve body 12. Fluid, such as rain water or hydrocarbon contamination, flows from the inlet pipe 14 over a recessed area 51 of the ring 30 and into a channel 52. The fluid flows along the channel through a slot 53 in a shroud 54 that protects the sensor element 33 and the stopper 32 from dynamic forces of any inrush of fluid from the inlet pipe 14. The shroud 54, as further shown in FIG. 9, is supported by the channel 52. A back support 55 is welded to shroud 54 to react force from such an inrush of fluid. From the channel 52, the fluid contacts the periphery of the upper portion of the sensor element 33 and flows down the periphery of the sensor element through a hole 56 in the base of the channel. The fluid collects in a cavity 57 in the top of the stopper 32 and remains in contact with the sensor element 33 until the fluid overflows from the cavity. In this fashion, a small trickle of hydrocarbon from the inlet pipe 14 will trigger the sensor element 33, causing the pin 39 to shear through the weakened sensor, and closing the valve before any of the hydrocarbon exits from the outlet port 31.

FIG. 6 shows that the sensor element 33 is an annular cylinder.

FIGS. 7 and 8 show further details of the removable channel member 52. The ring 30 has an access hole 61 aligned with respective holes 62, 63 in the channel side rails 37, 38. The outer periphery of the ring 30 also has an annular notch 64 for containing a nitrile O-ring (65 in FIGS. 3 and 4) for sealing the ring 30 in the valve body 12.

During assembly, the stopper shaft 40 is inserted in the top of the stopper 32, the sensor element 33 is slid over the stopper shaft 40 and into the cavity 57, and then the lower pin 39 is inserted through the stopper, the sensor element 33, and through a hole (65 in FIG. 11) in the stopper shaft 40. (See FIG. 3.) Then the ring 30 and channel 52 are placed over the stopper shaft 40 so that the sensor element 33 is aligned within the hole 56 in the bottom of the channel. (See FIG. 5.) Then the upper pin 35 is inserted through the access hole 61 in the ring 30 in order to insert the upper pin through the hole 63 in the side rail 38, through the sensor element 33, through the slot (66 in FIG. 11) in the stopper shaft 40, and through the hole 62 in the channel side rail 37. Then ring 30, channel 52, and the components having been pinned to the channel 52, are placed in the cylindrical section 13 of the valve body 12, and the ring 30 is seated in the valve body. Then the shroud 54 is placed over the sensor element 33, pins 35, 39, and stopper 32, and the shroud is seated on the channel 52, as shown in FIG. 5. Then the valve cover 11 is placed on the valve body 12 and secured by the dogs (17, 18 in FIG. 2).

FIG. 9 shows an unobstructed section view of the shroud 54. This view shows one-half of the shroud. The two halves of the shroud are identical. The shroud is supported by the lower surfaces 71, 72 resting on the channel (52 in FIG. 5).

Figure 14:
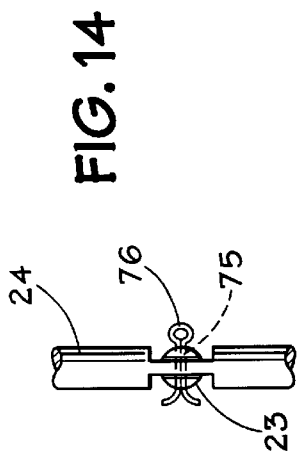
FIG. 14 is a top view showing a cotter-pin pinning the plunger shaft to a flag shaft prior to putting the sensing valve into service.

FIG. 10 shows the spring-loaded plunger 41 and the compression spring 73 in its free state. The lower end of the plunger 41 has a recess 74 for contacting the set screw 42 of the stopper shaft 40. The upper end of the plunger shaft 23 is slotted and has a hole 75 perpendicular to the slot. As further shown in FIG. 14, the slot receives a flattened region of the shaft 24 that carries the flags (21, 22 in FIG. 1), and the hole 75 receives a cotter pin 76 for pinning the plunger shaft 23 to the shaft 24 prior to installation of the valve. (See FIG. 14.) This pinning prevents the sensor element 33 from being inadvertently damaged prior to installation, because the cotter pin relieves loading of the plunger upon the sensor element. The cotter pin should be removed during installation, or else the flags will not indicate a closed state of the sensing valve. If the cotter pin is not removed during installation, however, the valve will still close in the presence of hydrocarbon, because the stopper shaft 40 is not attached to the plunger 41.

Figure 12:
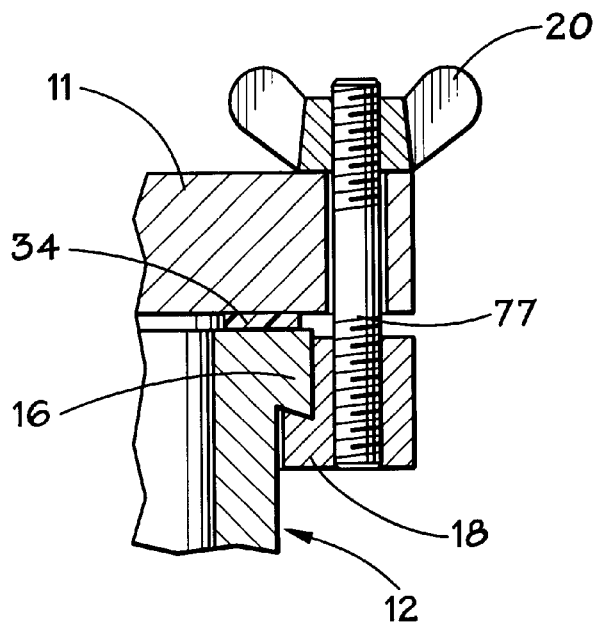
FIG. 12 is a cross-sectional view showing one of the four dog clamps used for securing the valve cover to the valve body.

FIG. 12 shows a section of the dog 18. A lower end of a threaded stud 77 is screwed into the dog 18 and secured to the dog with adhesive. A conventional wing nut 20 is screwed on the upper end of the stud 77 and tightened in order to clamp the valve cover 11 to the flange 16 of the valve body 12.

Figure 13:
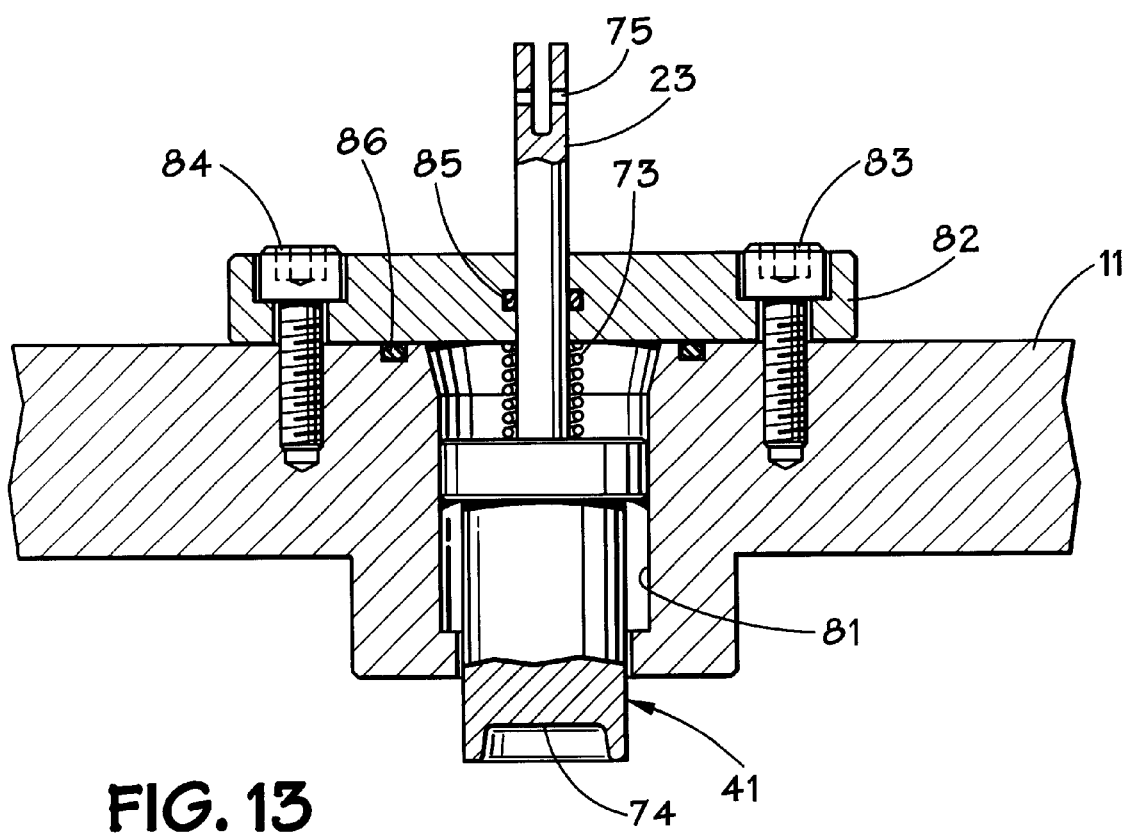
FIG. 13 is a cross-sectional view showing the plunger retained in the valve cover.

FIG. 13 shows a detailed cross-section of the spring-loaded plunger 41 installed in a bore 81 in the valve cover 11. A retainer cap 82 covers the bore 81 and screws 83, 84 secure the retainer cap to the valve cover 11. Nitrile O-rings 85 and 86 maintain a fluid-tight seal.

Figure 15:
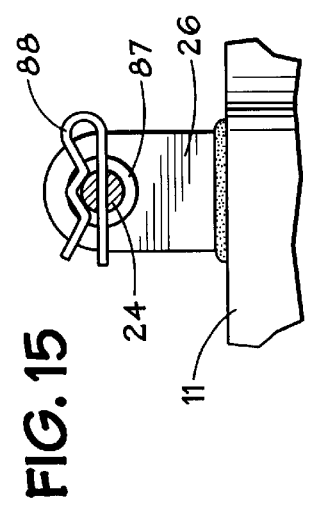
FIG. 15 is an end view showing how the flag shaft is journalled to the valve cover.
Figure 16:
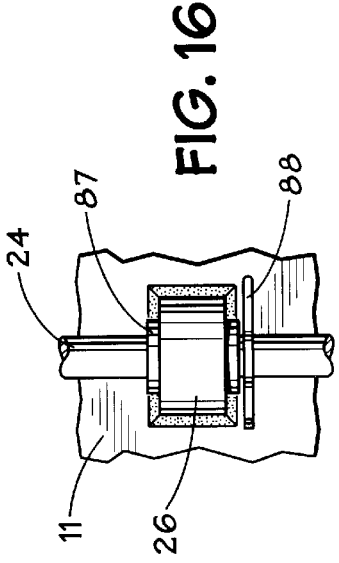
FIG. 16 is a top view corresponding to FIG. 15.

FIGS. 15 and 16 show further details of the mounting of the shaft 24 to the valve cover 11. A Teflon (polytetrafluroethylene) bushing 87 is force-fitted into the support lug 26, and the shaft 24 is inserted into the bushing. Then a retainer clip 88 is inserted into a hole in the shaft. In a similar fashion, there is a second retainer clip (89 in FIG. 3) at the opposite end of the shaft 24.

One should appreciate that the sensing valve 10 shown in FIGS. 1–4 has been designed to eliminate the need for precise tolerances and for ease of disassembly and maintenance in the field. For example, the valve cover 11 need not be precisely aligned with the valve cover 11, and the stopper 32 falls under its own weight into sealing engagement with the outlet port 21. Therefore the valve is less likely to malfunction due to any build-up of sludge, slime, corrosion, or debris. It should be appreciated, however, that the valve should be mounted in a stable, vertical, and level orientation.

Figure 17:
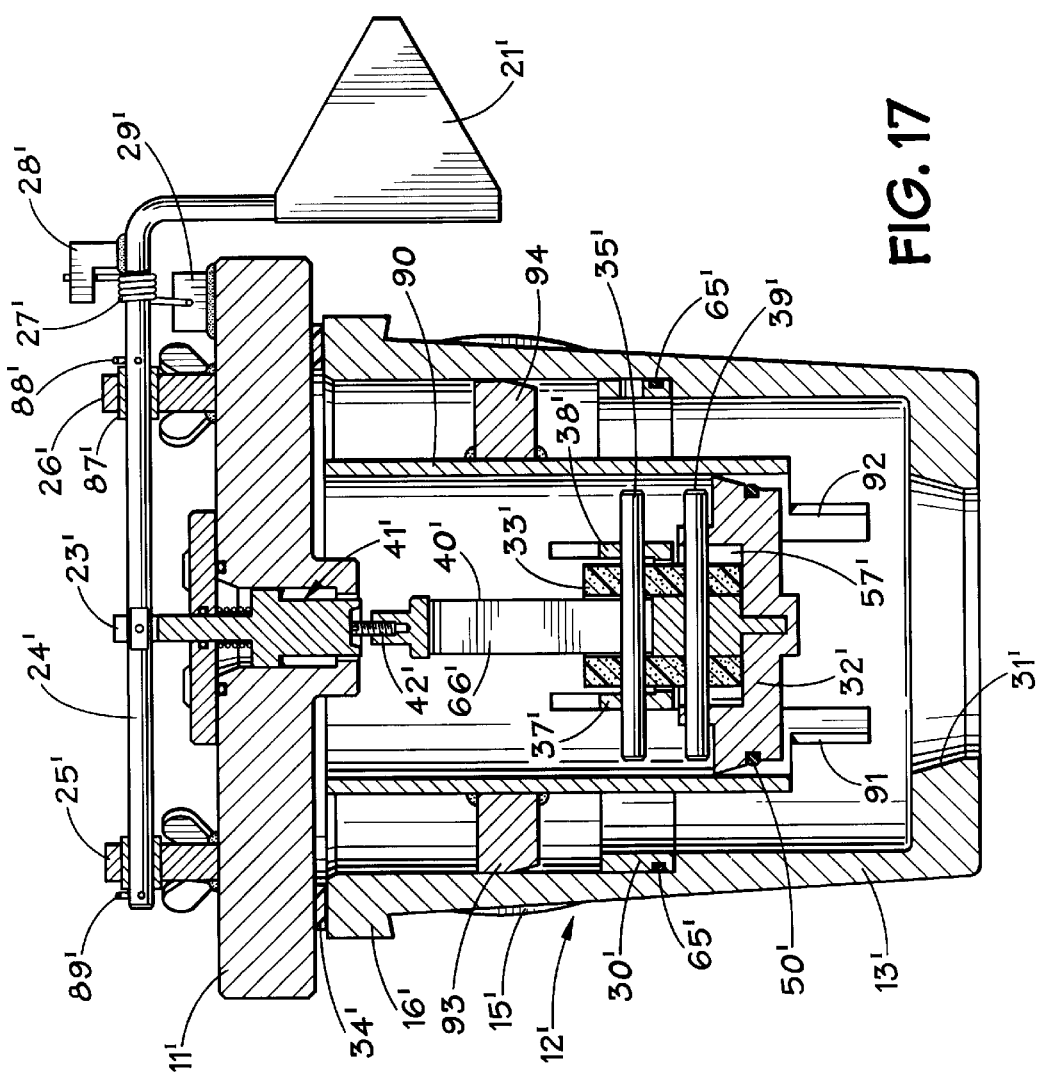
FIG. 17 is a cross-sectional view showing how the shroud can be modified in order to use the valve in an environment where the valve will not be kept level.

It should be understood that the construction of the sensing valve could be modified in various ways while still obtaining the desired advantage of rapid valve closure in the presence of medium or heavy hydrocarbon such as diesel fuel, fuel oil, or crude oil. For example, if the sensing valve is to be mounted in an unstable or inclined orientation, for example on a floating vessel such as an oil tanker, then the sensing valve could be modified to guide the stopper 32 into engagement with the outlet port 21 under such conditions. Such an alternative construction is shown in FIG. 17, which is similar to the view shown in FIG. 3. Components in FIG. 17 that are similar to components in FIG. 3 are shown with similar but primed reference numerals.

In FIG. 17 a modified shroud 90 has a set of four depending fingers 91, 92, only two of which are shown in FIG. 17, for encircling and guiding the stopper 32' into engagement with the outlet port 31' when the sensing valve is triggered and the valve would happen to be in an inclined orientation. Moreover, alignment lugs 93 and 94 (similar to the back support 55 in FIG. 5) are welded around the outer periphery of the shroud 90 so that the bottom ends of the fingers 91, 92 are aligned with the outlet port 31' when the shroud 90 is fully inserted into the cylindrical section 13' of the valve body 12'.

What is claimed is:

1. A method of shutting off a flow of fluid when a substance is present in the fluid, the method comprising:
    applying a tensile load to sensor element so that the sensor element is held in tension and will carry the tensile load in the absence of the substance and will fail to carry the tensile load in the presence of the substance, the sensor element being disposed in the flow of fluid; and
    actuating a flow control member to shut off the flow of fluid when the sensor element fails to carry the tensile load.

2. The method as claimed in claim 1, wherein the tensile load is applied to the flow control member by suspending the flow control member with the sensor element, so that the tensile load on the flow control member includes the weight of the flow control member.

3. The method as claimed in claim 1, wherein the flow control member is actuated to shut off the flow fluid by dropping the flow control member into a valve seat.

4. A method of shutting off a flow of fluid when a substance is present in the fluid, the method comprising:
    applying a tensile load to sensor element that will carry the tensile load in the absence of the substance and will fail to carry the tensile load in the presence of the substance, the sensor element being disposed in the flow of fluid; and
    actuating a flow control member to shut off the flow of fluid when the sensor element fails to carry the tensile load;
    wherein the tensile load is applied to the sensor element through at least one pin, and the sensor element fails to carry the tensile load by the pin shearing the sensor element.

5. A method of shutting off a flow of fluid when a substance is present in the fluid, the method comprising:
    applying a tensile load to a sensor element that will carry the tensile load in the absence of the substance and will fail to carry the tensile load in the presence of the substance, the sensor element being disposed in the flow of fluid; and
    actuating a flow control member to shut off the flow of fluid when the sensor element fails to carry the tensile load;
    which includes placing the sensor element in a cavity in the top of the flow control member, and directing the flow of fluid to the cavity in the top of the flow control member.

6. A sensing valve for shutting off a flow of fluid when a substance is present in the fluid, the sensing valve comprising:
    a housing having an inlet port and an outlet port;
    a flow control member disposed in the housing for permitting the flow of fluid from the inlet port to the outlet port when the flow control member is in an open position and shutting off the flow of fluid from the inlet port to the outlet port when the flow control member is in a closed position; and
    a sensor element responsive to the presence of the substance in the fluid and coupled to the flow control member and the housing for causing the flow control member to move from the open position to the closed position when the substance is present in the fluid;
    wherein the sensor element is coupled to the flow control member and the housing for applying a tensile load to the sensor element so that the sensor element is held in tension and for causing the flow control member to move from the open position to the closed position when the sensor element fails to carry the tensile load in response to the presence of the substance in the fluid.

7. The sensing valve as claimed in claim 6, wherein the tensile load applied to the sensor element includes weight of the flow control member, the flow control member is disposed above a valve seat in the housing, the flow control member is in sealing contact with the valve seat when the flow control member is in the closed position, and the coupling of the sensor element between the flow control member and the housing permits the flow control member to fall into the sealing contact with the valve seat when the sensor element fails to carry the tensile load in response to the presence of the substance in the fluid.

8. The sensing valve as claimed in claim 6, wherein the sensor element is soluble in the presence of aromatic hydrocarbon so that the flow control member moves from the open position to the closed position when aromatic hydrocarbon is present in the fluid flow.

9. The sensing valve as claimed in claim 6, wherein the sensor element consists essentially of polystyrene.

10. A sensing valve for shutting off a flow of fluid when a substance is present in the fluid, the sensing valve comprising:
    a housing having an inlet port and an outlet port;
    a flow control member disposed in the housing for permitting the flow of fluid from the inlet port to the outlet port when the flow control member is in an open position and shutting off the flow of fluid from the inlet port to the outlet port when the flow control member is in a closed position; and
    a sensor element responsive to the presence of the substance in the fluid and coupled to the flow control member and the housing for causing the flow control member to move from the open position to the closed position when the substance is present in the fluid;
    wherein the sensor element is coupled to the flow control member and the housing for applying a tensile load to the sensor element and causing the flow control member to move from the open position to the closed position when the sensor element fails to carry the tensile load in response to the presence of the substance in the fluid; and
    wherein the sensor element is seated in a cavity in the top of the flow control member, and the sensing valve has a flow channel for directing the flow of fluid from the inlet port to the cavity in the top of the flow control member.

11. A sensing valve for shutting off a flow of fluid when a substance is present in the fluid, the sensing valve comprising:
    a housing having an inlet port and an outlet port;
    a flow control member disposed in the housing for permitting the flow of fluid from the inlet port to the outlet port when the flow control member is in an open position and shutting off the flow of fluid from the inlet port to the outlet port when the flow control member is in a closed position; and
    a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and wherein the sensing valve has a flow channel from the inlet port to the sensor element, the flow channel defining a hole through which the fluid from the inlet port falls, and the sensor element is disposed in the hole.

12. A sensing valve for shutting off a flow of fluid when a substance is present in the fluid, the sensing valve comprising:

a housing having an inlet port and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and wherein the coupling of the sensor element to the flow control member and the housing includes at least one pin for applying the tensile load to the flow control member and shearing the sensor element in response to the presence of the substance in the fluid.

13. A sensing valve for shutting off a flow of fluid when a substance is present in the fluid, the sensing valve comprising:

a housing having an inlet port and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and which includes a shaft to which the flow control member is mounted, wherein the shaft has a longitudinal axis along which the flow control member moves during movement of the flow control member from the open position to the closed position, the shaft defines an elongated longitudinal slot, the sensor element is an annular cylinder disposed around the shaft, and the sensor element is coupled to the housing by a pin passing through the sensor element in a direction perpendicular to the longitudinal axis of the shaft and passing through the slot in the shaft.

14. A sensing valve for shutting off a flow of fluid when a substance is present in the fluid, the sensing valve comprising:

a housing having an inlet and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and which includes a shaft to which the flow control member is mounted, wherein the shaft has a longitudinal axis along which the flow control member moves from the open position to the closed position, the shaft defines a hole perpendicular to the longitudinal axis, the sensor element is an annular cylinder disposed around the shaft, and the shaft is coupled to the flow control member and the sensor element by a pin passing through the sensor element in a direction perpendicular to the longitudinal axis of the shaft and passing through the hole in the shaft and also passing through the flow control member.

15. A sensing valve for shutting off a flow of fluid when a substance is present in the fluid, the sensing valve comprising:

a housing having an inlet port and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and which includes a shaft to which the flow control member is mounted, wherein the shaft has a longitudinal axis along which the flow control member moves during movement of the flow control member from the open position to the closed position, the shaft defines an elongated longitudinal slot, the shaft also defines a hole perpendicular to the longitudinal axis, the sensor element is an annular cylinder disposed around the shaft, and the sensor element is coupled to the housing by a first pin passing through the sensor element in a direction perpendicular to the longitudinal axis of the shaft and passing through the slot in the shaft, and the sensor element is coupled to the flow control member by a second pin passing through the sensor element in a direction perpendicular to the longitudinal axis of the shaft and passing through the hole in the shaft.

16. A sensing valve for shutting off a flow of fluid when a substance is present in the fluid, the sensing valve comprising:

a housing having an inlet port and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and which further includes a shroud coupled to the housing and disposed within the housing for shielding the sensor element and the flow control member from dynamic forces of any inrush of the fluid from the inlet port.

17. A sensing valve for shutting off a flow of fluid when a substance is present in the fluid, the sensing valve comprising:

a housing having an inlet port and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and wherein the housing includes a removable cover and a flag is mounted to the removable cover, and the flag is coupled to the flow control member for raising the flag when the flow control member moves from the open position to the closed position.

18. A sensing valve for shutting off a flow of fluid when a substance is present in the fluid, the sensing valve comprising:

a housing having an inlet port and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and wherein the housing has a cylindrical section about a generally vertical axis and provides the outlet port at a lower region of the cylindrical section, the housing has a removable cover on top of the cylindrical section, and the housing also has an inlet pipe section about a generally horizontal axis and intersecting the cylindrical section, the inlet pipe section provides the inlet port, and the flow control member is disposed within a lower region of the cylindrical section and is mounted to the housing for translation in a generally vertical direction between the open position and the closed position, and the sensing valve further includes a generally vertical shaft to which the flow control member is mounted, wherein the generally vertical shaft is mounted to the housing for lowering of the generally vertical shaft during movement of the flow control member from the open position to the closed position, and the sensing valve further includes a flag mounted to the cover and coupled to the generally vertical shaft for raising the flag when the shaft is lowered during movement of the flow control member from the open position to the closed position.

19. The sensing valve as claimed in claim 18, wherein the flag is mounted to a generally horizontal shaft pivotally mounted to the cover, a spring is coupled between the generally horizontal shaft and the cover for raising the flag, and the generally vertical shaft is coupled to the generally horizontal shaft for preventing rotation of the generally horizontal shaft until the generally vertical shaft is lowered during movement of the flow control member from the open position to the closed position.

20. The sensing valve as claimed in claim 19, further including a spring-loaded plunger mounted within the cover for coupling the generally-vertical shaft to the generally-horizontal shaft.

21. A sensing valve for shutting off a flow of fluid when a substance is present in the fluid, the sensing valve comprising:

a housing having an inlet port and an outlet port;

a flow control member disposed in the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled to the flow control member and the housing for causing the flow control member to move from the open position to the closed position when the substance is present in the fluid;

wherein the sensor element is coupled to the flow control member and the housing for applying a tensile load to the sensor element and causing the flow control member to move from the open position to the closed position when the sensor element fails to carry the tensile load in response to the presence of the substance in the fluid; and wherein the housing has a cylindrical section about a generally vertical axis and provides the outlet port at a lower region of the cylindrical section, the housing has a removable cover on top of the cylindrical section, and the housing also has an inlet pipe section about a generally horizontal axis and intersecting the cylindrical section, the inlet pipe section provides the inlet port, and the flow control member is disposed within a lower region of the cylindrical section and is mounted to the housing for translation in a generally vertical direction between the open position and the closed position, and wherein the flow control member and the sensor element are mounted to a removable channel member for directing the fluid from the inlet pipe to the sensor element, and an assembly of the removable channel member, the flow control member, and the sensor element is removable from the sensing valve when the cover is removed to open the housing.

22. The sensing valve as claimed in claim 21, wherein the removable channel member includes an outer ring for seating of the assembly in the cylindrical section of the housing.

23. The sensing valve as claimed in claim 21, wherein the sensing valve further includes a shroud placed over the sensor element and the flow control member for shielding the sensor element and the flow control member from dynamic forces of any inrush of the fluid from the inlet port, and the shroud is supported by the channel member.

24. A sensing valve for shutting off a flow of fluid when a substance is present in the fluid, the sensing valve comprising:

a housing having generally horizontal pipe section providing an inlet port, and the housing having a generally vertical cylindrical section providing an outlet port at a lower region of the generally vertical cylindrical section;

a flow control member disposed in the generally vertical cylindrical section of the housing for permitting the flow of fluid from the inlet port to the outlet port when the flow control member is in an open position and shutting off the flow of fluid from the inlet port to the outlet port when the flow control member is in a closed position; and a sensor element responsive to the presence of the substance in the fluid and coupled between the flow control member and the housing for causing the flow control member to move from the open position to the closed position when the substance is present in the fluid;

wherein the sensor element is coupled between the flow control member and the housing for applying a tensile load to the sensor element and causing the flow control member to move from the open position to the closed position when the sensor element fails to carry the tensile load in response to the presence of the substance in the fluid;

wherein the sensor element is seated in a cavity in the top of the flow control member, and the sensing valve has a channel member for directing the flow of fluid from the inlet port to the cavity in the top of the flow control member; and wherein the sensor element is pinned to the channel member by a first pin, and the sensor element is pinned to the flow control member by a second pin.

25. The sensing valve as claimed in claim 24, further including a generally vertical shaft to which the flow control member is mounted, wherein the generally vertical shaft is mounted to the housing for lowering of the generally vertical shaft during movement of the flow control member from the open position to the closed position, and the sensing valve further includes a flag mounted to the cover and coupled to the generally vertical shaft for raising the flag when the shaft is lowered during movement of the flow control member from the open position to the closed position.

26. The sensing valve as claimed in claim 24, wherein the flag is mounted to a generally horizontal shaft pivotally mounted to the cover, a spring is coupled between the generally horizontal shaft and the cover for raising the flag, and the generally vertical shaft is coupled to the generally horizontal shaft for preventing rotation of the generally horizontal shaft until the generally vertical shaft is lowered during movement of the flow control member from the open position to the closed position.

27. The sensing valve as claimed in claim 26, further including a spring-loaded plunger mounted within the cover for coupling the generally vertical shaft to the generally horizontal shaft.

28. The sensing valve as claimed in claim 24, further including a shroud disposed over the sensor element and the flow control member for shielding the sensor element and the flow control member from dynamic forces of any inrush of the fluid from the inlet port, the shroud being supported by the channel member.

29. The sensing valve as claimed in claim 24, wherein the housing includes a removable cover, and an assembly of the channel member, the flow control member, and the sensor element is removable from the housing when the cover is removed to open the housing.

30. The sensing valve as claimed in claim 24, wherein the housing includes a removable cover and a flag mounted to the removable cover, and the flag is coupled to the flow control member for raising the flag when the flow control member moves from the open position to the closed position.

31. A sensing valve for shutting off a flow of fluid when a substance is present in the fluid, the sensing valve comprising:

a housing having generally horizontal pipe section providing an inlet port, and the housing having a generally vertical cylindrical section providing an outlet port at a lower region of the generally vertical cylindrical section;

a flow control member disposed in the housing for permitting the flow of fluid from the inlet port to the outlet port when the flow control member is in an open position and shutting off the flow of fluid from the inlet port to the outlet port when the flow control member is in a closed position;

a sensor element responsive to the presence of the substance in the fluid and coupled to the flow control member and the housing for causing the flow control member to move from the open position to the closed position when the substance is present in the fluid; and a channel member seated in the cylindrical section of the housing for directing the flow of fluid from the inlet port to the sensor element;

wherein the housing includes a removable cover, the flow control member and the sensor element are mounted to the channel member, and an assembly of the channel member, the flow control member, and the sensor element is removable from the housing when the cover is removed to open the housing.

32. The sensing valve as claimed in claim 31, further including a shroud disposed over the sensor element and the flow control member for shielding the sensor element and the flow control member from dynamic forces of any inrush of the fluid from the inlet port, the shroud being supported by the channel member.

33. The sensing valve as claimed in claim 31, further including a flag mounted to the removable cover, wherein the flag is coupled to the flow control member for raising the flag when the flow control member moves from the open position to the closed position.

* * * * *

UNITED STATES PATENT AND TRADEMARK OFFICE
CERTIFICATE OF CORRECTION

PATENT NO. : 6,644,336 B2
DATED : November 11, 2003
INVENTOR(S) : Lyman J. Dolan It is certified that error appears in the above-identified patent and that said Letters Patent is hereby corrected as shown below:

Column 7,
Line 10, change "to sensor" to -- to a sensor --;
Line 28, before "sensor" insert -- a --.

Signed and Sealed this

Tenth Day of February, 2004

JON W. DUDAS
*Acting Director of the United States Patent and Trademark Office*